May 24, 1932.  K. M. WILHELM  1,859,813
ILLUMINATED ADVERTISING DEVICE
Filed Nov. 20, 1929  2 Sheets-Sheet 1
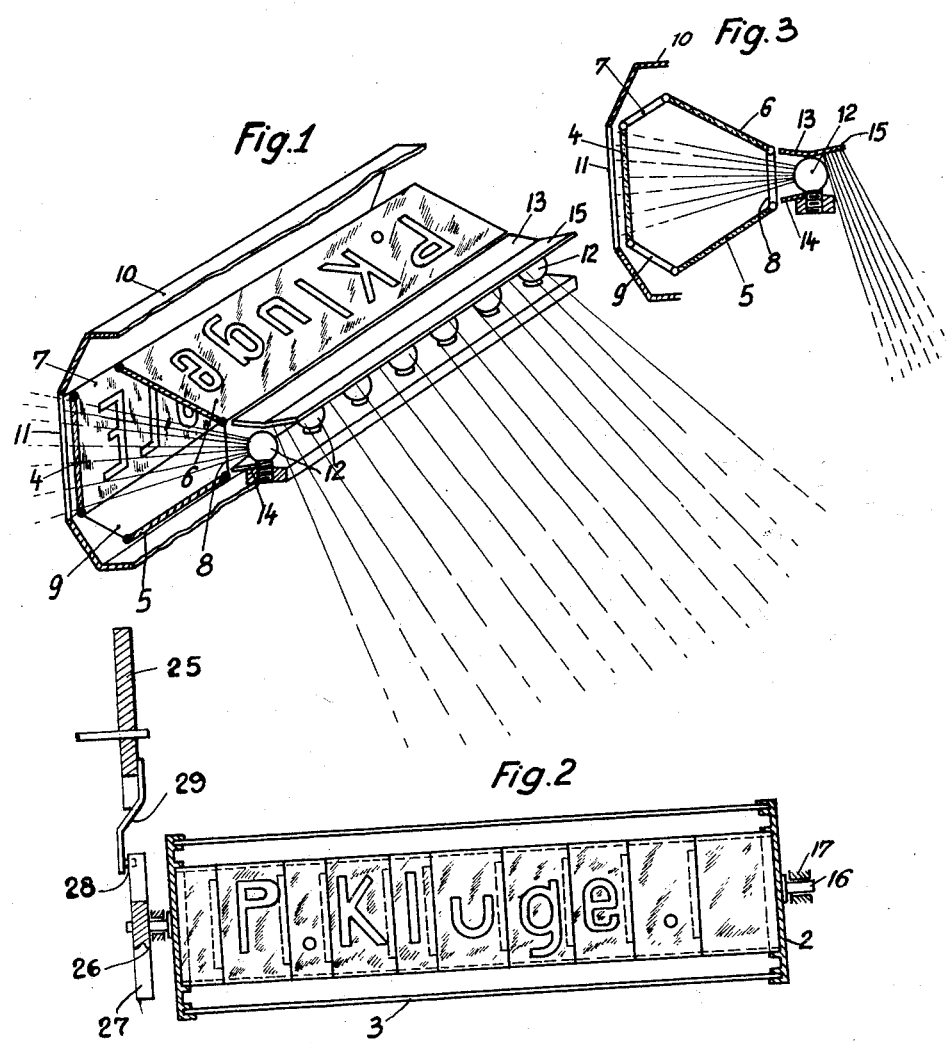
Inventor:
Karl Max Wilhelm May 24, 1932.  K. M. WILHELM  1,859,813
ILLUMINATED ADVERTISING DEVICE
Filed Nov. 20, 1929  2 Sheets-Sheet 2
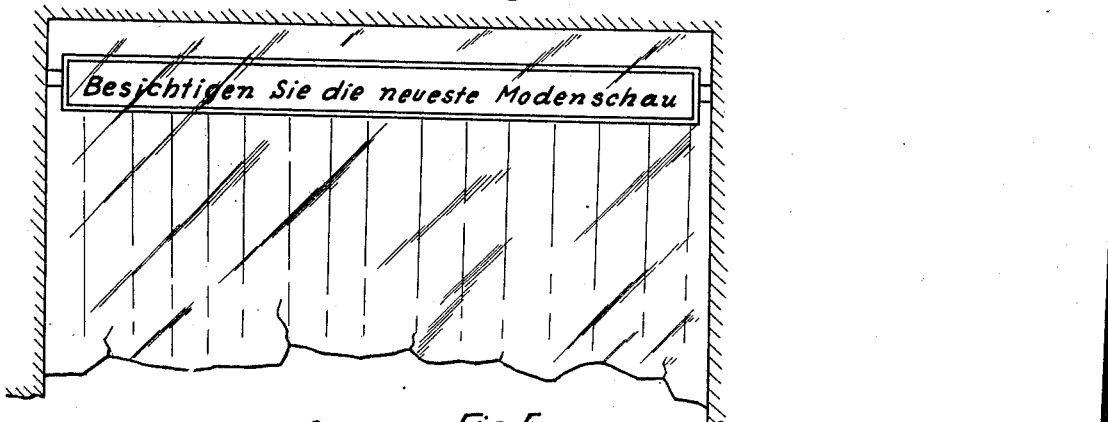
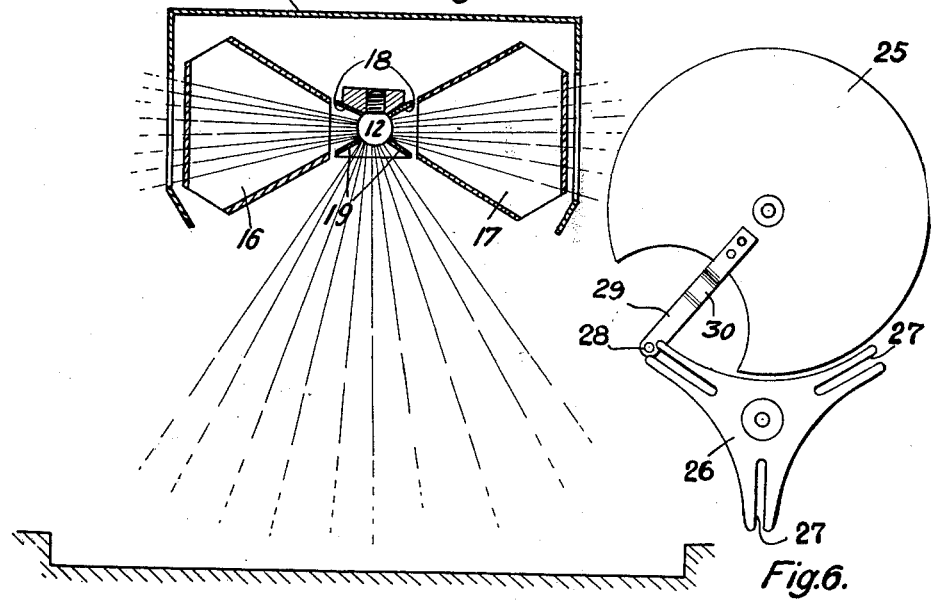
Inventor:
Karl Max Wilhelm
By
Attorney Patented May 24, 1932

1,859,813

UNITED STATES PATENT OFFICE

KARL MAX WILHELM, OF BOCHUM, GERMANY

ILLUMINATED ADVERTISING DEVICE

Application filed November 20, 1929, Serial No. 408,616, and in Germany November 24, 1928.

This invention relates to an illuminated advertising device provided with a rotatory drum having transparent walls bearing or constituting the advertisements which are illuminated from the interior of said drum. The source of light is, however, according to this invention, arranged outside the drum so that also the neighbourhood of the device can be, and is, illuminated. There are, for this purpose, provided in the drum wall apertures through which the light emitted by the lamps can pass through the interior of the drum to the opposite drum wall which bears an advertisement or constitutes such a one. Suitably arranged reflecting members collect the rays and conduct them in the direction to the eyes of the observers. The sectional shape of the drum is preferably such that those walls of the drum which bear or constitute the advertisements form a trilateral prism having longitudinal slots between its faces whereby the drum or trilateral prism is turned into a kind of a six-sided prism, there being always one of said slots opposite one of the faces of the prism and the advertisement thereon being illuminated by the lamps through the oppositely located slot.

The drum or prism is enclosed in a casing which is closed on all sides, except its front side where there is a suitably large opening through which the illuminated advertisement can be seen, and besides said opening another one is provided in the lower part of the rear of the casing, this opening being intended for the exit of rays of light which are not intended for the illumination of the advertisements, but for illuminating a certain part of the space below the same.

The drum or prism is rotated intermittently so that every advertisement can be seen a certain time whereafter another advertisement appears in the front opening of the casing.

The drum or prism consists, preferably, of a frame forming or having open fields which can be filled up with the transparent advertisements, and these latter may be composed of individual letters or the like so that it is possible to change or vary the individual advertisements also by exchanging a part of, or all, the letters etc. that have been inserted into the respective field of the drum or prism frame.

The improved advertising device dealt with in the preceding paragraphs is intended chiefly for shop windows and serves the twofold purpose of showing the various advertisements just present in it, and of illuminating the goods or articles exposed to view in the respective window, that is to say, those goods or articles which can be illuminated by the rays of light passing through the aperture in the lower part of the casing, as above mentioned.

The invention is illustrated diagrammatically and by way of example on the accompanying drawings on which Figure 1 is a perspective representation of an advertising device designed according to this invention, the rear half of the outer casing and the righthand side of the drum or prism being left away in order to show the interior of the drum or prism;

Figure 2 is a front-view of the drum or prism, the sides thereof being shown in section;

Figure 3 is a transverse section through the drum or prism, and through the front part of the casing, the other parts of the same being left away;

Figure 4 is a front view of the upper part of a shop window equipped with the improved advertising device, Figure 5 is a transverse section through a modification, and Figure 6 is an end view showing a conventional means for rotating the rotary body or drum.

Referring to Figs. 1–3, the drum or prism consists of suitably shaped side walls 1 and 2 connected with one another by rods 3 which are so designed that they form guide ways for transparent panes 4, 5 and 6 so located with respect to one another as to form a sort of a trilateral prism. Each pane may consist of a plurality of individual plates bearing letters or the like, as in Fig. 2. The panes are, however, separated from one another by comparatively large longitudinal slots 7, 8 and 9 through which rays of light can be thrown into the interior of the drum or prism, or more precisely, through that interior onto the inner face of the oppositely located advertisement, as shown in Fig. 3.

The side plates are provided with pinions 16 supported in bearings 17, in which the drum can be rotated, and it is rotated intermittently in such a manner that always one of the advertising panes is located in front of a suitably large opening 11 of a casing 10 enclosing the drum. The means for rotating the drum intermittently in this way may be of any suitable design, and the movements may be transmitted to the drum, for instance, by such members as 18, 19, 20 and 21 which need not be described in detail in view of their obvious simplicity.

The drum is stopped after a part-rotation of 120 degrees, remains then stationary for a certain short period of time, and thereafter another part-rotation takes place, and so on.

Besides the opening 11 at the front of the casing 10, another opening (not shown) is provided in the bottom of the casing at the rear thereof (as already mentioned in the introductory part of this specification), this opening serving for letting pass rays of light also down upon certain of the goods or articles exposed to view in the respective shop window. The light is produced, as usual, by electric incandescence lamps 12 arranged opposite that slot which is just located at the rear (Fig. 2). Two reflecting plates 13 and 14 deflect one half of the rays through the rear slot of the drum or prism onto the advertisement at the front, and a third reflecting plate 15 deflects the other half of the rays down into the shop window for the purpose stated.

There are cases in which it is desired or necessary to illuminate two advertisements which are located counter to one another, as well as something therebelow, for instance a freely disposed show-case or a door or whatever else it may be. A constructional form of the device answering these requirements is shown in Fig. 5, in which the casing 20 encloses two drums 16 and 17 which are designed in the same manner as described with respect to Figs. 1–3 and are also turned in intervals, as already described. Between them are reflecting plates 18 and 19, and between these plates are the lamps 12. Between the plates 19 is a slot through which the light can illuminate the space therebelow and the object or objects present in that space.

If the space below the device need not be illuminated, the bottom of the casing may be completely closed.

An advertising device of this kind can, for instance, be advantageously disposed at a house at right angles to the outer wall thereof so as to extend transversely to the foot-way and be visible, therefore, from both directions. It is also possible to design the drum in such a manner that more than only one drum wall, i. e. advertising wall, is visible; this is particularly advantageous if the device is so designed that the axis of the drum stands, or the axes of the drums stand, vertically.

Figs. 2 and 6 show a conventional means for intermittently operating the rotary body or drum, consisting of a disc 25 which receives a uniform and continuous rotation by means of any suitable motor, not shown. On the axle of the rotary body or drum, a three-armed member 26 is provided having three forks, each fork forming a slot 27. The forks themselves are arranged 120° apart, but the number thereof must, of course, correspond with the number of transparent sides provided in the drum. On the disc 25 there is mounted an arm 29, having a bent portion 30, which has a contact pin 28 on the end thereof. As clearly indicated in Fig. 6, upon rotation of the disc 25, the pin 28 will enter one of the slots 27 of a fork and will be carried along until the pin leaves the slot and, upon the second revolution of the disc, the pin will carry along the next fork by means of its slot and so on, thus providing an intermittent operation of the drum, which is timed by the speed of the motor and the disc 25, depending upon the desired periodic time limit for each transparent side.

I claim:

1. An illuminated advertising device, comprising, in combination, a rotatory hollow body, the circumferential suface of which consists of flat and transparent sides adapted to show advertisements, longitudinal slots being left between said sides and so located with respect to them that each of them lies counter to one of said sides; illuminating means arranged outside said body at the rear thereof just behind the slot there located at the time being, and means for turning the said body.

2. An illuminated advertising device, comprising, in combination, a rotatory hollow body, the circumferential surface of which consists of flat and transparent sides adapted to show advertisements, longitudinal slots being left between said sides and so located with respect to them that each of them lies counter to one of said sides; illuminating means arranged outside said body at the rear thereof just behind the slot there located at the time being, a casing enclosing the said drum and the illuminating means, and having at its front a window through which the front advertisement is visible, and means for turning said body.

3. An illuminated advertising device, comprising, in combination, a rotatory hollow body resembling a trilateral prism and having longitudial slots between the sides of the prism, each side being transparent and adapted to receive an advertisement, and each slot being located counter to one of said sides; illuminating means arranged outside the said prism at the rear thereof just behind the slot there located at the time being, and means for turning the said body.

4. An illuminated advertising device, comprising, in combination, a rotatory hollow body, the circumferential surface of which consists of flat and transparent sides adapted to show advertisements, longitudinal slots being left between said sides and so located with respect to them that each of them lies counter to one of said sides; illuminating means arranged outside said body at the rear thereof just behind the slot there located at the time being; reflectors so arranged relatively to said illuminating means that they deflect the rays of light through the neighbouring slot and into and through the said hollow body onto the advertisement at the front thereof, and means for turning said body.

5. An illuminated advertising device, comprising, in combination, two intermittently rotated hollow bodies, the circumferential surfaces of which consist of flat and transparent sides adapted to receive advertisements, and which are arranged parallel to one another with a gap therebetween, each of said bodies having a longitudinal slot between two of said sides, said slots being so located with respect to the sides that each of them lies counter to them; and illuminating means arranged in said gap just between the slots there located at the time being.

6. An illuminated advertising device, comprising, in combination, a rotatory hollow body, the circumferential surface of which consists of flat and transparent sides adapted to show advertisements, longitudinal slots being left between said sides and so located with respect to them that each of them lies counter to one of said sides; illuminating means arranged outside said body at the rear thereof just behind the slot there located at the time being, and means for turning the said body in intervals.

7. An illuminated advertising device, comprising, in combination, a rotatory hollow body, the circumferential surface of which consists of flat and transparent sides adapted to show advertisements, longitudinal slots being left between said sides and so located with respect to them that each of them lies counter to one of said sides; illuminating means arranged outside said body at the rear thereof just behind the slot there located at the time being; a reflector so arranged as to be adapted to deflect a part of the rays of light downwardly, and means for turning the said body.

8. An illuminated advertising device, comprising, in combination, a rotatory hollow body, the circumferential surface of which consists of flat and transparent sides adapted to show advertisements, longitudinal slots being left between said sides and so located with respect to them that each of them lies counter to one of said sides; illuminating means arranged outside said body at the rear thereof just behind the slot there located at the time being, a casing enclosing the said drum and the illuminating means, and having at its front a window through which the front advertisement is visible and at the rear of its bottom an opening through which rays of light can pass downwardly, and means for turning the said body.

9. An illuminated advertising device, comprising, in combination, a rotatory hollow body, the sides of which are formed by frames adapted to receive transparent panes adapted to constitute in their entirety advertisements, said body having longitudinal slots between said frames, said slots being so located with respect to the frames that each of them lies counter to one of the said frames and the panes inserted thereinto; illuminating means arranged outside said body at the rear thereof just behind the slot there located at the time being, and means for turning the said body.

10. An illuminated advertising device, comprising, in combination, a rotatory hollow body, the circumferential surface of which consists of transparent sides adapted to show advertisements and longitudinal slots remaining between said sides and so located with respect thereto that each of them lies counter to one of said sides; and illuminating means arranged outside of said body at the rear thereof behind the slot there located.

11. An illuminated advertising device, comprising a rotatory hollow body having spaced transparent sides adapted to show advertisements; and illuminating means arranged outside of said body and adapted to project the light rays through the spaces of the sides onto the sides, the transparent sides being so arranged that each will be provided with an oppositely-arranged space for the light.

12. An illuminated advertising device, comprising a rotatory body having spaced sides adapted to show advertisments; and illuminating means arranged outside of said body and adapted to project the light rays through spaces between the sides onto the sides.

In testimony whereof I affix my signature.

KARL MAX WILHELM.